US008602552B2

(12) United States Patent
Marini et al.

(10) Patent No.: US 8,602,552 B2
(45) Date of Patent: Dec. 10, 2013

(54) EYEWEAR HAVING AN ARCUATE FLEXURAL MEMBER

(75) Inventors: Solomon Marini, Littleton, MA (US); Paul A. Martinson, Maplewood, MN (US); Laurent Froissard, Cranston, RI (US); Glen E. Stanley, Woodstock, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 57 days.

(21) Appl. No.: 13/410,944

(22) Filed: Mar. 2, 2012

(65) Prior Publication Data

US 2013/0229615 A1 Sep. 5, 2013

(51) Int. Cl.
G02C 5/16 (2006.01)
G02C 5/14 (2006.01)

(52) U.S. Cl.
CPC . *G02C 5/16* (2013.01); *G02C 5/143* (2013.01)
USPC .......................................................... 351/114

(58) Field of Classification Search
CPC ................................... G02C 5/16; G02C 5/143
USPC .................................................. 351/111–123
See application file for complete search history.

(56) References Cited

U.S. PATENT DOCUMENTS

| 2,280,666 | A | 4/1942 | Schofield |
| 3,016,054 | A | 1/1962 | Rosenblatt |
| 3,612,669 | A | 10/1971 | Vinson |
| 4,231,360 | A | 11/1980 | Zlocysti |
| 4,243,851 | A | 1/1981 | Forney |
| 4,287,614 | A | 9/1981 | Lönnstedt |
| 4,490,857 | A | 1/1985 | Leight |
| 4,615,050 | A | 10/1986 | Lönnstedt |
| 4,944,361 | A | 7/1990 | Lindgren |
| 5,038,776 | A | 8/1991 | Harrison |
| 5,068,923 | A | 12/1991 | Sjöqvist |
| 5,673,095 | A | 9/1997 | Conway |
| 6,017,119 | A * | 1/2000 | Huang ............................. 351/63 |
| 6,056,082 | A | 5/2000 | Lindgren |
| 6,148,817 | A | 11/2000 | Bryant |
| 6,513,925 | B1 | 2/2003 | Bonacci |
| 6,758,562 | B1 | 7/2004 | Barnette |
| 7,628,484 | B2 | 12/2009 | Lamontagne |
| 7,717,554 | B2 | 5/2010 | Perie |
| 2009/0122256 | A1 * | 5/2009 | Wu ............................... 351/120 |

FOREIGN PATENT DOCUMENTS

WO WO 2005/116727 12/2005
WO WO 2009/118009 10/2009

OTHER PUBLICATIONS

International Search Report for International Publication No. PCT/US2013/027220, dated May 2, 2013.

* cited by examiner

*Primary Examiner* — Huy K Mai
(74) *Attorney, Agent, or Firm* — Craig A. Deutsch

(57) ABSTRACT

An eyewear article having a flexing portion including first and second longitudinally disposed ribs is disclosed. In an exemplary embodiment, the flexing portion has a radius of curvature that is less than 80 mm. The eyewear article of the present invention provides a balance of fit and comfort suitable for a range of user head sizes.

20 Claims, 6 Drawing Sheets

EYEWEAR HAVING AN ARCUATE FLEXURAL MEMBER

TECHNICAL FIELD

This invention relates to eyewear for a person that exhibits an improved fit, in particular eyewear offering an improved fit on a range of head sizes.

BACKGROUND

Eyewear articles, such as eyeglasses intended to correct a person's vision, and safety glasses, intended to protect a person's eyes or face from harm, are widely known. Both types of eyewear often rest on the nose, and above or on each ear of a user. A user's perception of how well eyewear fits may be influenced by how well the eyewear fits on the nose and over the ears, perhaps together with whether the lenses of the glasses are too close to the person's eyes or face, or other factors.

Prior eyewear articles have attempted to provide comfortable eyewear by specifying an eyewear article for use on individuals having a particular head size. In addition, many designs incorporate features such as spring hinges, or mechanisms that allow the eyewear to be adjusted for a particular wearer. Such approaches result in increased costs due to complicated design and manufacturing requirements, or a need to stock multiple sizes of each eyewear design.

Ultimately, there is a continued need for better fitting eyewear, suitable for use by large groups of users.

SUMMARY

Glossary

In reference to the invention, the following terms are defined as set forth below:

"and/or" means "and", "or", and a combination of "and" and "or."

"angularly disposed" when referring to ribs of a flexing portion means the ribs are not parallel such that one or more major surfaces of the ribs form an angle that is not within 5° of 180°.

"attachment portion" means a feature of the lens, frame, or other suitable feature that a temple piece may be secured to.

"contact portion" when referring to the contact portion of a temple piece means the portion that contacts the head of a user just above and/or behind the normal position of the ear.

"flexing portion" refers to a portion of a temple piece that flexes when subjected to an appropriate force, as when an eyewear article is positioned for use on the head of a user, for example.

"flexural modulus" means the ratio of stress to strain in flexural deformation, and may be measured according to ASTM D790 or ISO 178, for example.

"force exerted at a contact portion" means the force exerted in a direction generally normal to the surface of the contact portion upon the head of a user, for example, and/or the corresponding force exerted by the head of the user on the contact portion, and may be measured at a location approximately 110 mm from the frontal plane of an eyewear article when the eyewear article is positioned for use.

"lens" means a structure through which a user can see the surrounding environment and may include any suitable material.

"portion" means part of a larger thing.

"positioned for use" when referring to an eyewear article means the eyewear article is positioned generally in front of the eye or eyes of a user to provide the intended functionality of the eyewear article.

"unflexed state" when referring to the temple piece or flexing portion of an eyewear article means a neutral state in which little or no forces are exerted at a contact portion of the temple piece.

"radius of curvature" means the radius of an osculating circle at a point of a curve, consistent with the traditional mathematical meaning of the term.

"width" when used to describe the width of a human head refers to the distance between a point just above the normal position of each ear.

The present invention provides for an eyewear article having a temple piece extending rearwardly from a front of an eyewear article that includes a flexing portion having a radius of curvature ($\rho$) and having first and second longitudinally disposed ribs. The first and second ribs rotate relative to one another when the flexing portion is flexed to accommodate the head of a user. When the temple piece is in an unflexed state, the first rib is angularly disposed with respect to the second rib and $\rho < 80$ mm. In various embodiments $\rho$ is between 20 mm and 60 mm, or between 45 mm and 55 mm. In some embodiments, the flexing portion has a maximum radius of curvature ($\rho M$) and a minimum radius of curvature ($\rho m$), and $[\rho M - \rho m] < 5$ mm. The eyewear article may further include an attachment portion, with the temple piece rotatably secured to the attachment portion, and $\rho$ may be within 20 mm and 80 mm at a distance 30 mm from the attachment portion along the length of the temple piece.

In some exemplary embodiments, each rib has first and second major surfaces separated by a thickness (t), and each rib has a length (l) in the longitudinal direction of the rib and a height (h) in a direction perpendicular to each of the thickness (t) and the length (l), and the first and second major surfaces are substantially planar. In some embodiments, length (l) is between 15 mm and 45 mm, and the height (h) of each rib varies along the length of each rib. In other exemplary embodiments, each rib has first and second major surfaces separated by a thickness (t), and each rib has a length (l) in the longitudinal direction of the rib and a height (h) in a direction perpendicular to each of the thickness (t) and the length (l), and the first and second major surfaces are curved in the direction of the height of the rib. In some embodiments, the eyewear article includes more than two longitudinally disposed ribs, and each rib comprises first and second major surfaces separated by a thickness (t), and the first major surfaces of each rib is not perpendicular with respect to a transverse plane bisecting the eyewear article into imaginary upper and lower halves.

In some exemplary embodiments, the temple piece is made of a material selected from the group consisting of polycarbonates, polyesters, polyamides, and acetals. The flexing portion may be made of a material having a flexural modulus between 800 MPa and 2500 MPa, or between 800 MPa and 1700 MPa or between 1000 MPa and 1200 MPa.

In some exemplary embodiments, the temple piece includes a contact portion, and a force (F) exerted normal to the contact portion is between 50 g and 140 g when the eyewear article is positioned for use on a human head having a width (W) between 130 mm and 170 mm. In some exemplary embodiments, F may be between 50 g and 110 g, or F may be between 70 g and 110 g when the eyewear article is positioned for use on a human head having a width (W) between 150 mm and 180 mm.

In some exemplary embodiments, the temple piece further includes a contact portion, and a first force (F1) is exerted normal to the contact portion when the eyewear article is positioned for use on a human head having a width of 130 mm, and a second force (F2) is exerted normal to the contact portion when the eyewear article is positioned for use on a human head having a width of 180 mm, and (F2−F1)<50 grams.

The present invention further provides for an eyewear article having a temple piece extending rearwardly from a front of an eyewear article that includes a flexing portion having a radius of curvature (ρ) and having first and second longitudinally disposed ribs. Each rib has first and second major surfaces separated by a thickness (t), and when the temple piece is in an unflexed state, ρ<80 mm and the first major surface of each rib is not perpendicular with respect to a transverse plane bisecting the eyewear article into imaginary upper and lower halves. In some embodiments, the temple piece further includes a contact portion, and a first force (F1) is exerted at the contact portion when the eyewear article is positioned for use on a human head having a width of 130 mm, and a second force (F2) is exerted at the contact portion when the eyewear article is positioned for use on a human head having a width of 180 mm, and wherein (F2−F1) <50 grams.

The eyewear of the present invention may be safety glasses, goggles, sunglasses, cosmetic glasses, vision correction glasses, and/or other eyewear articles as known in the art. The above summary of the present invention is not intended to describe each disclosed embodiment or every implementation of the present invention. The Figures and the Detailed Description, which follow, more particularly exemplify illustrative embodiments. U.S. patent application Ser. No. 13/410, 924, filed Mar. 2, 2013, titled "Eyewear Having a Flexural Member" and filed on the same date herewith, addresses the structure and configuration of an exemplary eyewear article having a flexing portion, and is incorporated herein by reference.

BRIEF DESCRIPTION OF DRAWINGS

The present invention will be further explained with reference to the appended Figures, wherein like structure is referred to by like numerals throughout the several views, and wherein.

DETAILED DESCRIPTION

The present invention provides an eyewear article having features that provide a balance of fit and comfort suitable for a range of head sizes. The eyewear article provides sufficient force at contact portions of a temple piece to maintain the eyewear article on a user having a relatively small head width, while providing a force within a desired comfort range when positioned on a user having a relatively large head width. In an exemplary embodiment, the eyewear article provides a desired level of force at contact portions of a temple piece that is less dependent on a user's head width than prior eyewear articles.

Figure 1:
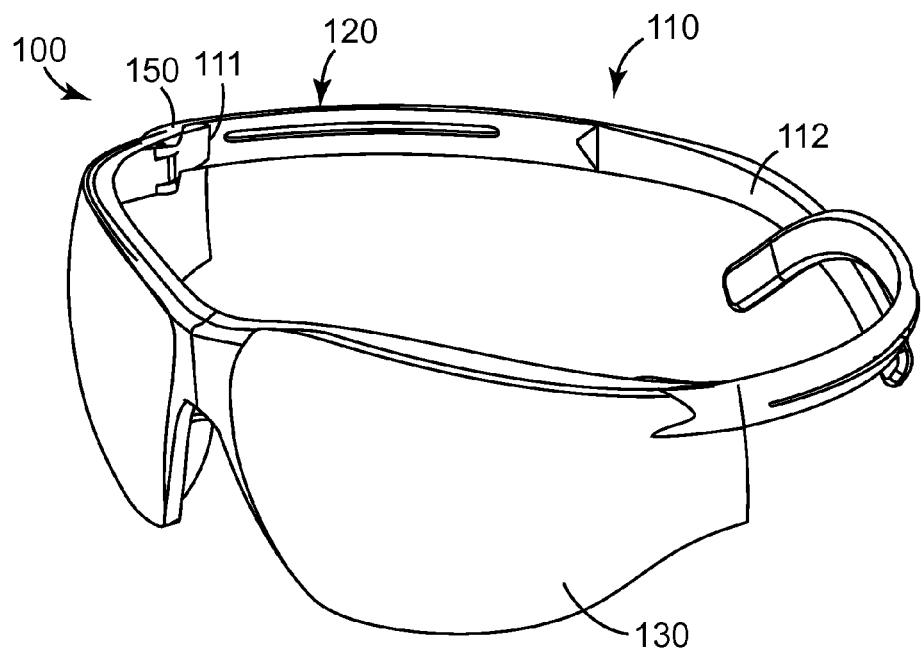
FIG. 1 is a perspective view of an eyewear article according to the present invention.

FIG. 1 shows a first exemplary embodiment of an eyewear article 100. Eyewear article 100 may include traditional eyewear components including one or more lenses 130 or a frame. Eyewear article 100 includes two temple pieces 110 each having a first end portion 111, a contact portion 112, and a flexing portion 120. Temple pieces 110 extend rearwardly from a front of eyewear article 100. Flexing portion 120 has a radius of curvature when in an unflexed state. Flexing portion 120 flexes outwardly to accommodate the head of a user, and is configured to provide desired characteristics over a range of suitable head widths. In an exemplary embodiment, contact portion 112 remains in a substantially constant orientation independent of the flexure that the flexing portion 120 is subjected to in accommodating a particular head width. When positioned for use, eyewear article 100 is positioned generally in front of the eye or eyes of a user to provide the intended functionality of eyewear article 100. The one or more lenses 130 interact with a user's field of vision, or substantially block the user's eyes and portions of a user's face from external elements.

In an exemplary embodiment, first end portion 111 of temple piece 110 may be secured to an attachment portion 150 of the one or more lenses 130, frame, or other suitable feature of eyewear article 100. Temple piece 110 may be secured to attachment portion 150 by any suitable means known in the art. For example, temple piece 110 may be rotatably secured with a hinge that permits pivotal motion of temple piece 110 about an axis at various positions between an open and closed position. This may be achieved by first end portion 111 of temple piece 110 including features that mate with corresponding features of the one or more lenses 130, a frame, or other suitable features of eyewear article 100, and are secured in a rotatable engagement with a screw, pin, or other fastener as known in the art. Temple piece 110 may be also attached using a snap fit attachment, for example. In another exemplary embodiment, eyewear article 100 may or may not include a frame, and temple pieces 110 may be attached to attachment points of the one or more lenses.

The components of eyewear article 100 described above may be formed separately and subsequently joined together to form the eyewear article. In an exemplary embodiment, one or more lenses 130 and a frame are formed integrally as a single piece, such as by injection molding, transfer molding, compression molding, or other techniques as known in the art. In another exemplary embodiment, temple pieces 110 may be formed by injection molding, transfer molding, compression molding, or other techniques known in the art, and subsequently joined to a lens or frame. Alternatively, various parts, or the entire eyewear article 100, may be formed integrally.

Flexing portion 120 may be formed from a material having suitable properties to allow for elastic deformation over a range of normal bending that the temple piece and flexing portion may be subjected to. In an exemplary embodiment, temple piece 110 and/or flexing portion 120 are made from an ultraviolet stabilized blend of polycarbonate and polyester, such as a material having the trade name XYLEX X8300 available from Sabic Innovative Plastics of Pittsfield, Mass., or a blend of polycarbonate and polybutelene, such as a material having the trade name XENOY 5720 available from Sabic Innovative Plastics. In other exemplary embodiments, temple piece 110 and/or flexing portion 120 are made from a polycarbonate such as PC124R available from Sabic Innovative Plastics, or an acetal such as D100 ST available from E.I. Du Pont De Nemours and Co. Other suitable materials include other polycarbonates, polyesters, polyamides, acetals, thermoplastics, other suitable materials as known in the art, and suitable combinations of such materials.

In an exemplary embodiment, temple piece 110 and flexing portion 120 are made of a material having a flexural modulus between 800 MPa and 2500 MPa. In various exemplary embodiments, the flexural modulus may be between about 800 MPa and 1700 MPa, or between about 1000 MPa and about 1200 MPa.

Figure 2:
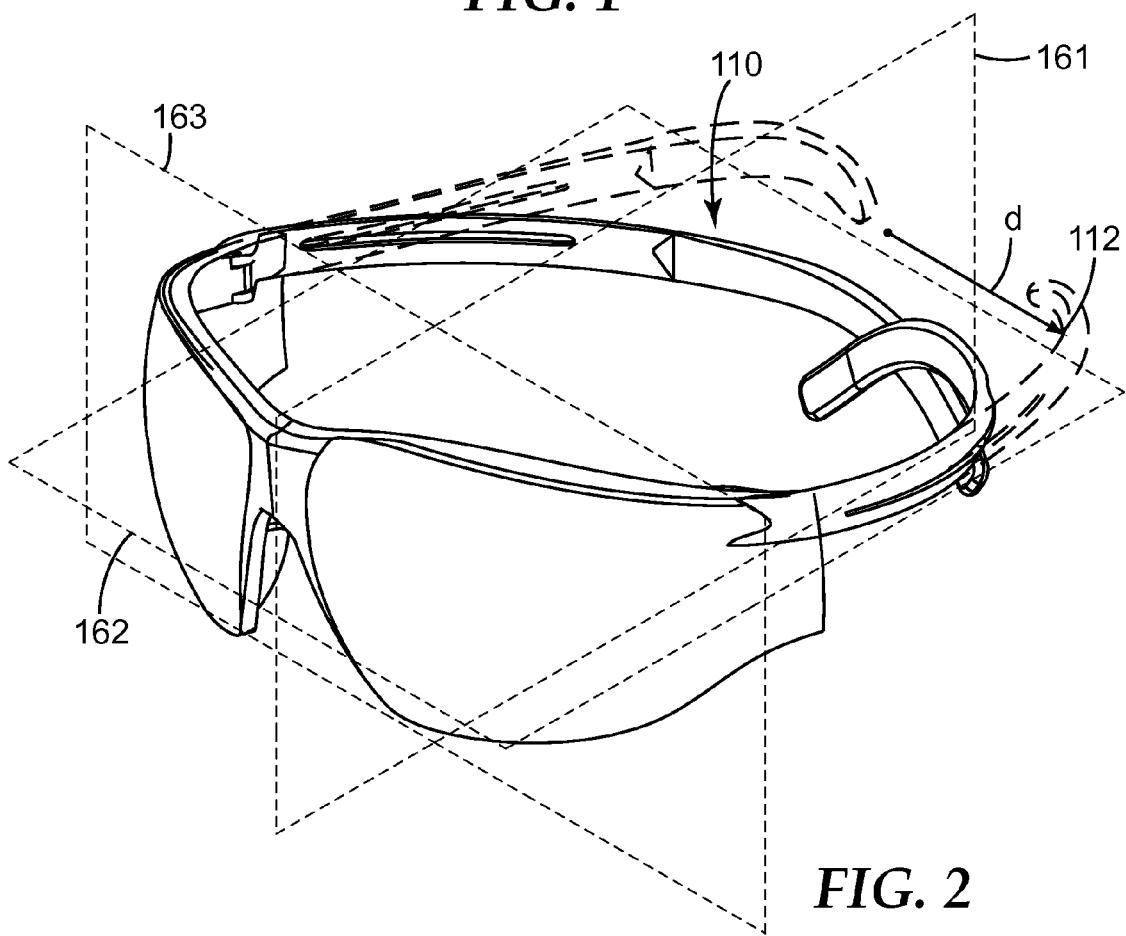
FIG. 2 is a perspective view of an eyewear article according to the present invention defining several reference planes by which the eyewear article may be better understood.

Certain features of an eyewear article according to the present invention may be understood in view of three reference planes defined relative to eyewear article 100 and shown in FIG. 2. With eyewear article 100 positioned horizontal as when positioned for use, and viewing eyewear article 100 from the outer side of the lens, which may be referred to as the front of the eyewear, mid-sagittal plane 161 bisects eyewear article 100 into imaginary left and right halves. Transverse plane 162 divides eyewear article 100 horizontally into imaginary upper and lower portions. Transverse plane 162 is generally parallel to a plane of rotation formed by temple piece 110 as it moves between open and closed positions, and as it moves from an unflexed state to a deflected state for accommodating the head of a user. Temple piece 110 is said to be in an open position when a hinge joining temple piece 110 to a frame or lens is fully opened, and temple piece 110 remains in an unflexed state such that no load is exerted on or by contact portion 112 of temple piece 110. Temple piece 110 is said to be in a closed position when a hinge is fully closed, such that temple piece 110 is folded inward, for example. Frontal plane 163 is orthogonal to both the mid-sagittal and transverse planes and substantially tangential to the frontmost portion of one or more lenses 130.

As shown in FIG. 2, the position of contact portion 112, and the corresponding deflection of temple piece 110, may be characterized by a distance d, substantially parallel to transverse plane 162 of eyewear article 100 and perpendicular to mid-sagittal plane 161, that separates the contact portion from the mid-sagittal plane of eyewear article 100. For example, a first distance separates contact portion 112 from mid-sagittal plane 161 when temple piece 110 is in an open position and an unflexed state. When temple piece 110 is flexed to accommodate the head of a user, as shown in phantom for example, a second distance d separates contact portion 112 from mid-sagittal plane 161. The second distance d may be approximately one half the magnitude of the width of the head that eyewear article 100 is positioned on. When temple piece 110 is flexed, a restoring force acts to return temple piece 110 to a position in which it is not subject to flexure. The magnitude of the force exerted at contact portion 112 of temple piece 110 for a given deflection can be determined, and is related to the geometry and materials of the temple piece and of the eyewear article, as discussed further herein.

Figure 3:
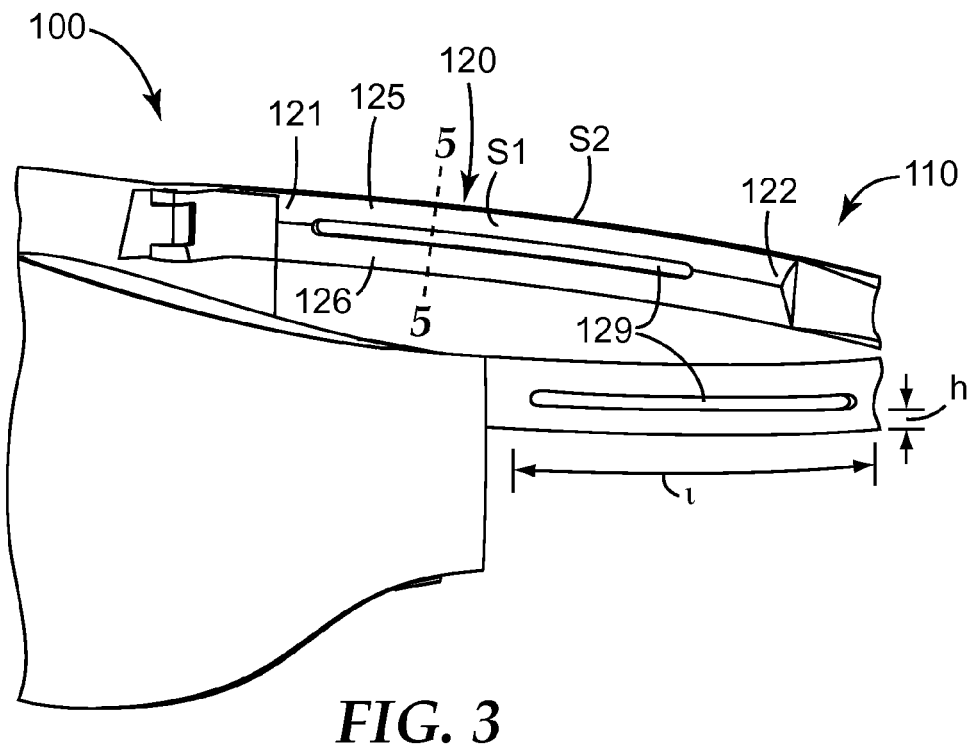
FIG. 3 is a perspective view of a temple piece extending rearwardly from a front of an eyewear article having an exemplary flexing portion according to the present invention.

FIG. 3 shows a temple piece 110 extending rearwardly from a front of an eyewear article 100 having an exemplary embodiment of a flexing portion 120 according to the present invention. Flexing portion 120 has a first end 121 and a second end 122, and first and second longitudinally disposed ribs 125 and 126 between first and second ends 121 and 122. Each rib has first and second major surfaces S1 and S2 separated by a thickness t, and includes a length l in the longitudinal direction of the rib, and a height h in a direction perpendicular to each of thickness t and length l. In various embodiments, l may be between approximately 10 mm and 75 mm, or between 15 mm and 45 mm, or may be approximately 30 mm.

In the exemplary embodiment shown in FIG. 3, inner peripheral edges of each of first and second ribs 125 and 126 define a slot 129 extending between portions of first and second ribs 125 and 126. In alternative exemplary embodiments, the inner peripheral edges may define a plurality of slots, grooves, or other openings, or the first and second ribs may be joined completely or partially along the lengths of the ribs by having connected inner peripheral edges, for example.

The thickness and height of ribs 125 and 126 may affect how flexing portion 120 bends and otherwise reacts when a force is applied to temple piece 110. Specifically, the thickness and height of ribs 125 and 126 may affect the location where flexing portion 120 initially bends when a force is applied to temple piece 110, and how the force is distributed throughout flexing portion 120. In various exemplary embodiments, ribs 125 and 126 may have a height h that is between 2 mm and 10 mm, or between 2.5 mm and 8 mm. In an exemplary embodiment, one or both of ribs 125 and 126 may have a height h that varies between a minimum height and a maximum height. In such an embodiment, flexing portion 120 may begin to bend at or near the location of the minimum height of the rib when an initial force is applied to the temple piece.

Figure 4A:
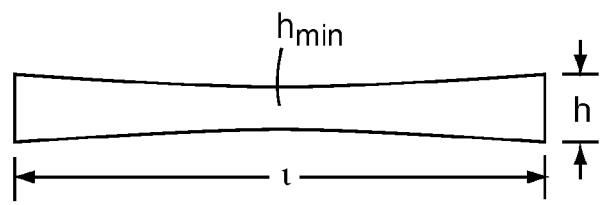
FIGS. 4a through 4c are side views of ribs of exemplary temple pieces according to the present invention.
Figure 4B:
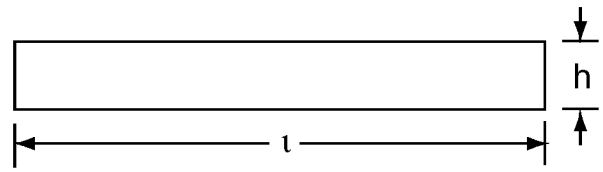
Figure 4C:
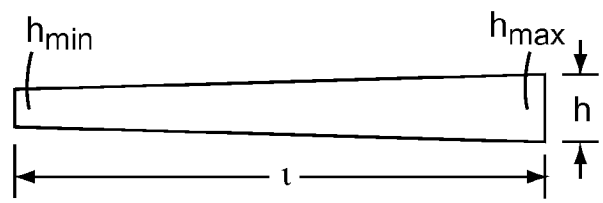

In an exemplary embodiment, the minimum height hmin of one or both of ribs 125 and 126 occurs at a position spaced from first and second ends 121 and 122 of the flexing portion 120, as shown in FIG. 4a for example. In other exemplary embodiments, the height of each rib may be uniform as shown in FIG. 4b, or may vary over the length of each rib from a maximum height hmax near first end 121 to a minimum height hmin near second end 122, as shown in FIG. 4c, for example.

Figure 5A:
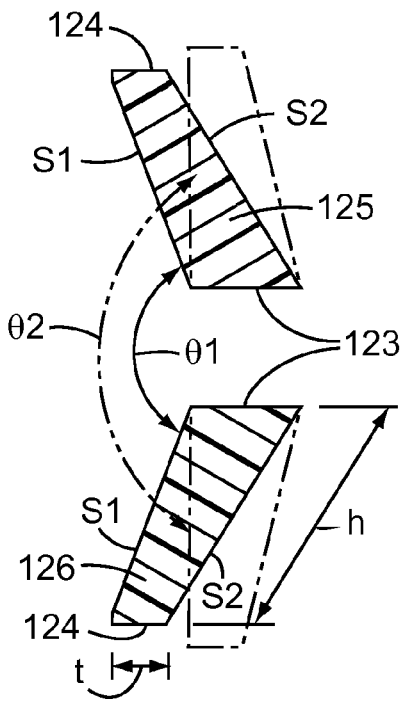
FIGS. 5a and 5b are sectional views of exemplary temple pieces having a flexing portion according to the present invention including ribs with first and second planar surfaces.

In an exemplary embodiment, first rib 125 is angularly disposed with respect to second rib 126 when the flexing portion is in an unflexed state, such that first major surfaces S1, major surfaces on the inner side of ribs 125 and 126, form an angle θ less than 180°. When temple piece 110 is flexed such that eyewear article 100 may be positioned for use on the head of a user, for example, ribs 125 and 126 rotate relative to one another such that angle θ becomes larger, as discussed in further detail below. As shown in FIG. 5a, for example, angle θ1 defined by the first planar surfaces S1 on the inner surface of each rib 125 and 126 when temple piece 110 is in an unflexed state, is less than the angle θ2 defined by the first planar surfaces S1 of each rib 125 and 126 when temple piece 110 is flexed. In the deflected state, angle θ2 has a value closer to 180° than θ1 does, such that the surfaces S1 of each rib 125 and 126 are closer to parallel. Because of the relative rotation of each rib, the area moment of inertia of the cross-section about the bending axis is decreased. Accordingly, less force is required for a marginal change in deflection of temple piece 110, and the force exerted at contact portion 112 increases more slowly or remains constant with further increases in deflection, as described in greater detail below.

Figure 5B:
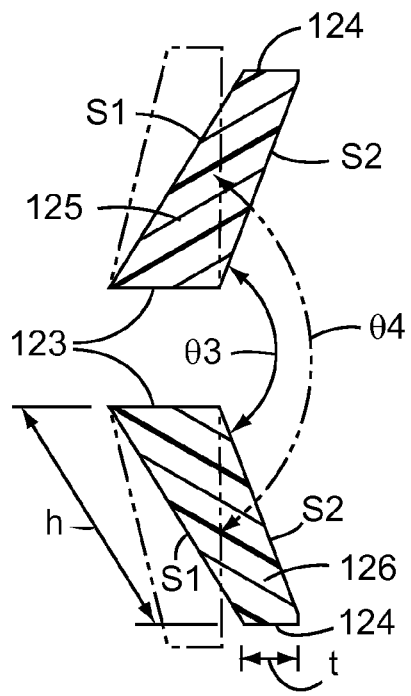

In another exemplary embodiment, first and second ribs 125 and 126 may be angularly disposed such that second major surfaces S2, major surfaces on the outer side of each rib, form an angle θ less than 180° when flexing portion 120 is in an unflexed state, as shown in FIG. 5b. When temple piece 110 is flexed such that eyewear article 100 may be positioned for use on the head of a user, first and second ribs 125 and 126 rotate such that the angle θ decreases towards 180° or an angle less than 180°. As shown in FIG. 5b, for example, the second planar surfaces S2 on the outer surface of each rib 125 and 126 define an angle θ3 when temple piece 110 is unflexed that is less than an angle θ4 defined by the second planar surfaces S2 of each rib 125 and 126 when temple piece 110 is flexed. In the deflected state, angle θ4 has a value closer to 180° than θ3 does, such that the surfaces S2 of each rib 125 and 126 are closer to parallel.

In another exemplary embodiment, first rib 125 and/or second rib 126 are angularly disposed such that one or both of the first and second major surfaces S1 and S2 is not perpendicular to transverse plane 162 of eyewear article 100, as shown in FIGS. 5a and 5b, for example. That is, one or both of first and second major surfaces S1 and S2 is not within 5° of forming a 90° angle with transverse plane 162 of eyewear article 100. When temple piece 110 is flexed such that eyewear article 100 may be positioned for use on the head of a user, first and second ribs 125 and 126 rotate such that one or both of first and second major surfaces S1 and S2 are closer to being in perpendicular to a transverse plane 162 of eyewear article 100.

In an exemplary embodiment, as shown in FIGS. 5a and 5b, first and second ribs 125 and 126 each have a thickness t between the first and second planar surfaces S1 and S2 that decreases from an inner peripheral edge 123 to an outer peripheral edge 124. In some exemplary embodiments, first and second ribs may have a thickness t at any particular point that is between 0.5 mm and 5 mm. In other embodiments, thickness t may be between 0.5 and 4 mm, or 0.5 mm and 2.5 mm. The flexing portion becomes stiffer as the thickness of the ribs is increased, and may result in a greater force at a contact portion of the temple piece for a particular temple separation as compared to a flexing portion having ribs with a smaller thickness.

In some exemplary embodiments, the thickness t may vary along the height of a rib between a thickness t of about 0.5 mm at outer peripheral edge 124 and a thickness t at inner peripheral edge 123 of about 2.5 mm, for example. In other exemplary embodiments, first and second ribs 125 and 126 have a thickness t that is constant across the height h of each rib, or a thickness t that increases from an inner peripheral edge 123 to an outer peripheral edge 124.

In some exemplary embodiments, the thickness tmax at inner peripheral edge 123 may remain constant along length l of each rib 125 and 126, while thickness tmin at outer peripheral edge 124 varies along length l. In an exemplary embodiment, thickness tmax at inner peripheral edge 123 is approximately 1.5 mm along length l, and tmin at outer peripheral edge 124 varies along length l from approximately 1.0 mm at each end to approximately 0.5 mm at a location along length l of approximately 10 mm from the end of each rib nearest first end 321 of flexing portion 320.

Figure 6:
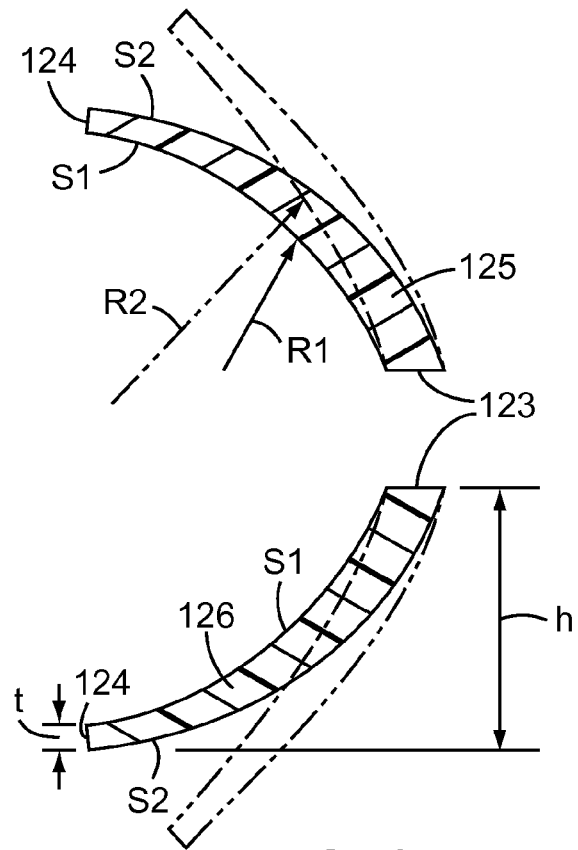
FIG. 6 is a sectional view of an exemplary temple piece having a flexing portion according to the present invention including ribs with first and second curved surfaces.

In another exemplary embodiment, shown in FIG. 6, first and second ribs 125 and 126 may exhibit first and second curved surfaces S1 and S2. Similar to the embodiments in which the ribs have first and second planar surfaces, the thickness of the ribs may be constant or may vary over the height of the rib. First and second ribs 125 and 126 each have a thickness t between first and second curved surfaces S1 and S2 that decreases from each inner peripheral edge 123 to each outer peripheral edge 124.

In other exemplary embodiments, first and second ribs 125 and 126 have a thickness t that is constant, or a thickness t that increases from inner peripheral edge 123 to outer peripheral edge 124. Alternatively, the inner peripheral edges of first and second ribs 125 and 126 may be connected, and the thickness t may vary across the height of each rib between each outer peripheral edge 124 and the point of connection of the inner peripheral edges 123 of the first and second ribs.

The curved surfaces of each rib 125 and 126 define a radius of curvature of the ribs. The ribs are angularly disposed to one another when in an unflexed state, such that the ribs define a particular radius of curvature R1. When a force is applied to the temple piece 110, as when the eyewear article is positioned for use on the head of a user, first and second ribs 125 and 126 may flex and/or rotate relative to one another such that the radius of curvature R2 becomes larger, as indicated by ribs 125 and 126 shown in phantom.

Figure 7:
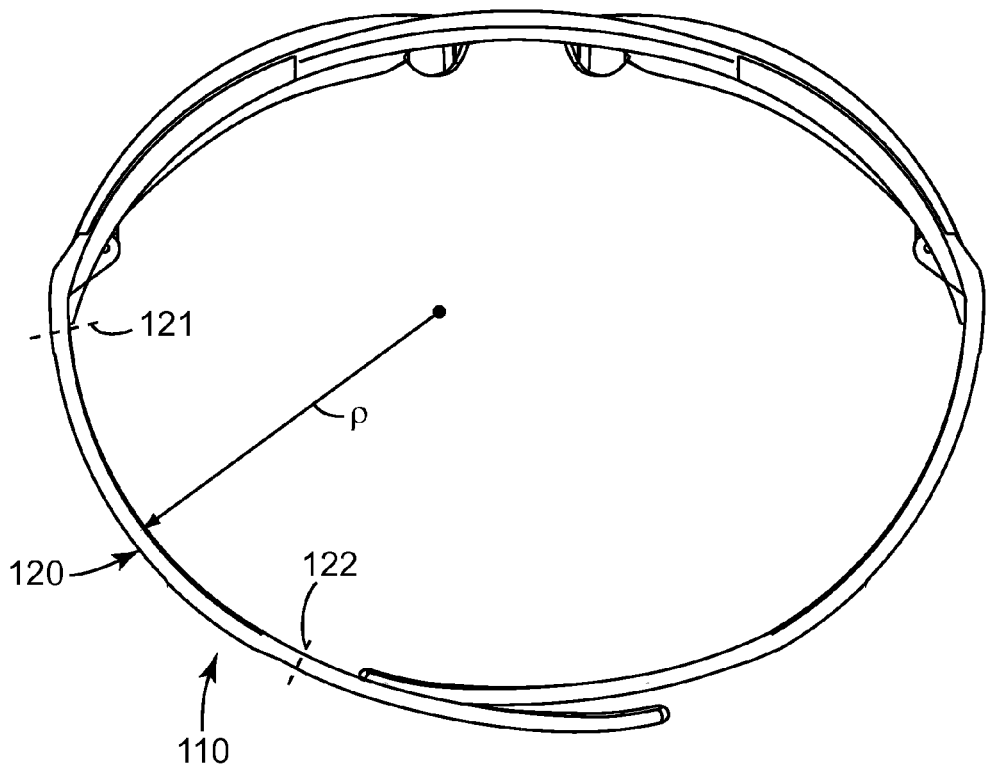
FIG. 7 is a top perspective view of an eyewear article according to the present invention having a temple piece and flexing portion with curvature in an unflexed state.

FIG. 7 shows an exemplary embodiment of an eyewear article 100 having a temple piece 110 according to the present invention. Temple piece 110 has a flexing portion 120 that exhibits a curvature when in an unflexed state. The curvature of flexing portion 120 can be defined by a radius of curvature. A radius of curvature is the radius of an osculating circle at a point on a curve, and can vary from point to point on a curve. A tight curve is generally said to have greater curvature and a lower radius of curvature, while a gentle curve is generally said to have less curvature and a greater radius of curvature. When temple piece 110 is deflected, to accommodate the head of a user for example, the radius of curvature of flexing portion 120 is increased. Accordingly, the curvature of an exemplary embodiment of a flexing portion 120 is greater in an unflexed state than when the eyewear is positioned for use on the head of a user.

Flexing portion 120 of temple piece 110 is characterized by a radius of curvature ρ when the flexing portion 120 is in an unflexed state. In an exemplary embodiment, radius of curvature ρ of flexing portion 120 when in an unflexed state is less than 80 mm. In other embodiments, the radius of curvature ρ of flexing portion 120 is between 20 mm and 60 mm, or between 45 mm and 55 mm, when flexing portion 120 is in an unflexed state. In an exemplary embodiment, the radius of curvature ρ is constant or nearly constant along the length of flexing portion 120. For example, flexing portion 120 may have a maximum radius of curvature ρM and a minimum radius of curvature ρm, and the magnitude of the maximum radius of curvature may be within 5 mm of the magnitude of the minimum radius of curvature. In an exemplary embodiment, the radius of curvature of temple piece 110 may be characterized as a radius of curvature at a particular point that is a certain distance along a length of the temple piece. For example, in an exemplary embodiment, the radius of curvature ρ of flexing portion 120 at a distance of 30 mm from attachment portion 150, or first end portion 111, along the length of temple piece 110, is between 20 mm and 80 mm.

A flexing portion having a radius of curvature as described above provides several advantages to an eyewear article according to the present invention. A flexing portion exhibiting a low radius of curvature must undergo additional deflection to accommodate the head of a wearer as compared to the deflection that a traditional temple piece lacking curvature would be subjected to when positioned on the same head. That is, while a substantially straight temple piece undergoes little or no bending before the contact portions of each temple piece are sufficiently separated to be positioned on the head of a user, temple pieces 110, and specifically flexing portions 120, of eyewear article 100 shown in FIG. 7 must undergo substantial deflection to accommodate the head of a user. Accordingly, temple piece 110 having such a flexing portion enters a stressed state with less separation between temple pieces 110 as compared to traditional eyewear. Sufficient force to secure eyewear article 100 on the head of a user may be obtained even with a more flexible temple piece. Furthermore, the radius of curvature present when flexing portion 120 is in an unflexed state allows the flexing portion to function as desired within an appropriate range of deflections corresponding to the majority of user head widths. That is, the specified curvatures of flexing portion 120 allow contact portion 112 of temple piece 110 to exert a desired level of force at a particular temple separation. These and other advantages will be more fully understood with reference to the force displacement characteristics of a temple piece having a flexing portion according to the present invention described below.

Eyewear articles including a flexing portion according to the present invention may provide a desired force at contact portions of the temple piece over a wider range of head sizes than previous eyewear articles. A significant portion of adult human heads have widths between 130 mm and 170 mm, measured just above the normal position of each ear. Further, the present inventors have determined that a force between approximately 40 grams and 140 grams, or between approximately 50 grams and 110 grams, or of approximately 80 grams, provides the optimal perceived balance of security and limited pressure such that an eyewear article will not inadvertently fall out of position and will not exert too much force so as to cause discomfort. Accordingly, exemplary eyewear article 100 exhibits a force at a contact portion within the above desired range when positioned for use on a human head having a width between 130 mm to 170 mm. That is, the force at contact portion 112 of temple piece 110 is within a desired range when a distance d separating contact portion 112 of each temple piece 110 from mid-sagittal plane 161 of eyewear article 100, as described above with reference to FIG. 2, is between 65 mm and 85 mm. In an exemplary embodiment, the force exerted normal to contact portion 112 is between 50 grams and 140 grams when eyewear article 100 is positioned for use on a human head heaving a width between 130 mm and 170 mm. In other exemplary embodiments, the force is between 50 grams and 110 grams, and may be between 70 grams and 110 grams when eyewear article 100 is positioned for use on a human head having a width of between 150 mm and 180 mm, or when d is between 75 mm and 90 mm.

A curve indicating force exerted at a contact portion versus displacement of a temple piece may be obtained for an eyewear article by measuring the force at various temple separations, for example by following Procedure 1 described below. Without being bound by theory, the slope of such a curve is related to the flexibility of the measured temple piece. Accordingly, a more flexible temple piece will generally result in a force at a contact portion that varies less over a range of deflections as compared to a stiff temple piece in which a small increase in deflection results in a relatively large increase in force exerted at a contact portion. In an exemplary embodiment, the force exerted at contact portion 112 of temple piece 110 varies by 50 grams or less over a range of temple separations between 130 mm and 180 mm. That is, a first force F1 is exerted at contact portion 112 when eyewear article 100 is positioned for use on a human head having a width of 130 mm, and a second force F2 is exerted at contact portion 112 when eyewear article 100 is positioned for use on a human head having a width of 180 mm, and the difference between F2 and F1 is less than or equal to 50 grams. In various other embodiments, the difference between F2 and F1 may be less than 30 grams, or less than 20 grams. In contrast, many prior designs exhibit forces that vary by significantly more than 50 grams over a range of temple separations between 130 mm and 180 mm.

The minimum desired force level at contact portion 112 of temple piece 110 can be obtained despite being constructed of a material having greater flexibility as compared to that of many traditional temple pieces. Such a result is due in part to a combination of inherent curvature exhibited by temple piece 110 and flexing portion 120 when in an unflexed state, and the presence of longitudinally disposed ribs as described herein. In an exemplary embodiment, temple piece 110 undergoes deflection even before the temple separation surpasses 80 mm. As a result, a force at contact portion 112 reaches a value above 50 grams when the temple separation is greater than 130 mm despite temple piece 110 having a greater flexibility than that of many prior eyewear articles. Further, because of the relatively flexible temple piece 110 facilitated by the inherent curvature of flexing portion 120, the force level remains closer to a desired level through a greater range of temple separations.

The force levels exerted at contact portion 112 exhibited by an exemplary embodiment of temple piece 110 is also attributable to the structure and configuration of flexing portion 120. Without being bound by theory, force exerted at contact portion 112 of temple piece 110 of the present invention can be characterized as proportional to the product of the temple separation and the relevant area moment of inertia. The area moment of inertia is calculated about an axis perpendicular to the longitudinal axis of temple piece 110, and in the plane of bending as is known in the art. As deflection increases, the force at contact portion 112 increases, and as deflection decreases, the force at contact portion 112 decreases. Similarly, as the area moment of inertia of a cross-section of temple piece 110 increases, the force at contact portion 112 increases, and as the area moment of inertia decreases, the force at contract portion 112 decreases.

The area moment of inertia of prior temple pieces is believed to remain substantially constant when deflected such that a force exerted at a contact portion is generally proportional to deflection. In an exemplary embodiment of flexing portion 120, however, the area moment of inertia of a particular cross-sectional location changes as the temple piece is flexed to accommodate the head of a user. As described above, first and second ribs 125 and 126 rotate relative to one another as temple piece 110 is deflected. As a result, the area moment of inertia at a particular cross-section of flexing portion 120 changes as temple piece 110 is deflected. For example, when the eyewear article is positioned for use on a head having a first width, the area moment of inertia of a cross-section is greater than when the eyewear article is positioned for use on a head having a second width that is greater than the first width. Accordingly, the area moment of inertia of a cross-section of the temple piece decreases as the flexing portion undergoes additional flexure. In this way, rather than exhibiting an increase in the force exerted at contact portions 112 of temple pieces 110 as temple pieces 110 are deflected or flexed to accommodate increasing head widths, the area moment of inertia is reduced. The force exerted at contact portion 112 of temple piece 110 remains substantially constant, or exhibits less variation, over a range of deflection of temple piece 110, and accordingly over a range of user head sizes.

In addition to the above described features and characteristics, the fit of an eyewear article may depend in part on the positioning of the temple pieces about a user's head, and particularly the location and orientation with which a contact portion of the temple piece contacts a user's head. In an exemplary embodiment of a temple piece according to the present invention, the contact portion may have a substantially planar surface to maximize the area that contacts the head of the user such that the pressure exerted on the user is minimized. Comfort may be reduced if, for example, only an edge of the contact portion contacts the head of a user. Accordingly, a contact portion of an exemplary temple piece according to the present invention remains in a substantially vertical orientation at any position within a range of temple separations corresponding to a desired range of head sizes, and remains in a plane substantially parallel to the transverse plane defined above. That is, an exemplary temple piece according to the present invention resists rotation about the longitudinal axis of the temple piece, or rotation out of the plane defined by the temple piece in an unflexed state.

Figure 8:
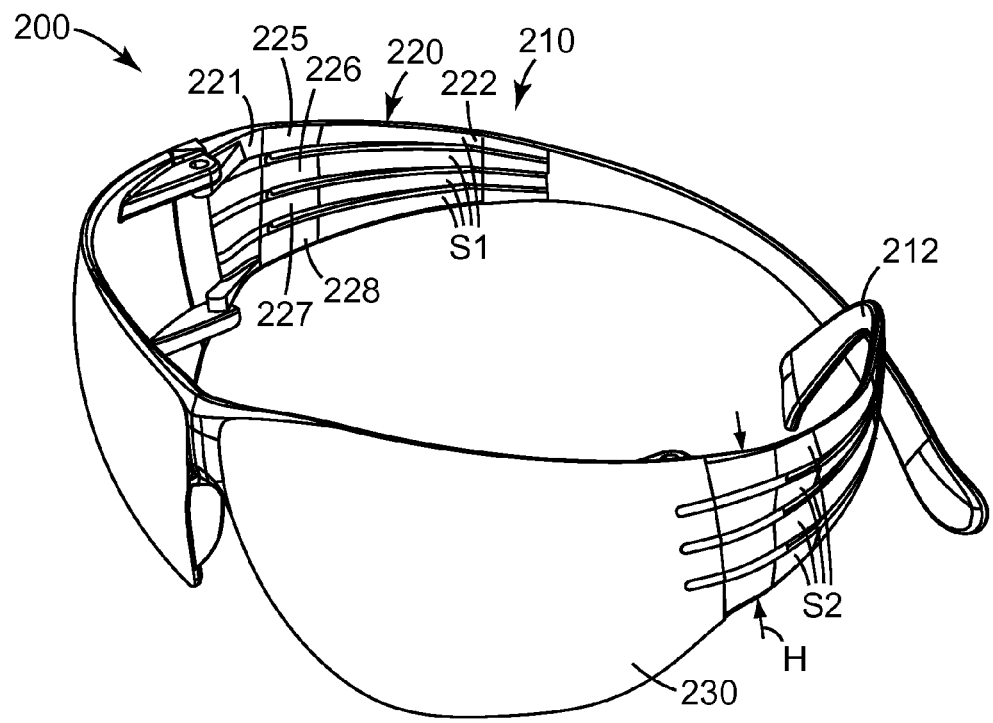
FIG. 8 is a perspective view of an eyewear article according to the present invention having a flexing portion that includes four longitudinally disposed ribs.
Figure 9:
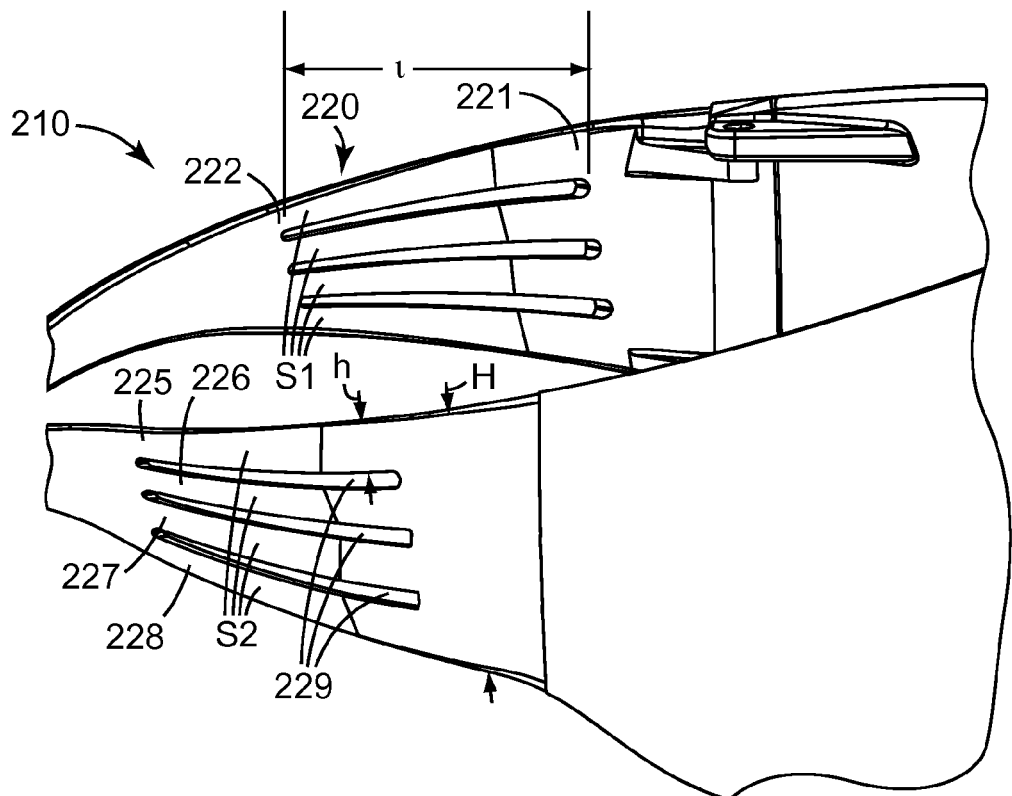
FIG. 9 is a perspective view of a flexing portion according to the present invention that includes four longitudinally disposed ribs.

An exemplary embodiment of eyewear article 200 according to the present invention is shown in FIGS. 8 and 9. Eyewear article 200 may include traditional eyewear components including one or more lenses 230 or a frame. Eyewear article 200 includes two temple pieces 210 each having a flexing portion 220 and a contact portion 212. Flexing portion 220 has a first end 221 and a second end 222, and includes first and second longitudinally disposed ribs 225 and 226, and third and fourth longitudinally disposed ribs 227 and 228. Each rib has first and second major surfaces S1 and S2, on the inner and outer surfaces of each rib, respectively, and a height h in a direction perpendicular to a length in the longitudinal direction of each rib. Further, flexing portion 220 exhibits a maximum height H in a direction parallel to a mid-sagittal plane of the eyewear article. In an exemplary embodiment, the maximum height H occurs at a position along temple piece 210 near end 221 of flexing portion 220. Various features and characteristics of eyewear article 200 may be defined relative to three reference plans described above with reference to eyewear article 100, and oriented as shown in FIG. 2.

In an exemplary embodiment, rib 225 is angularly disposed with respect to rib 226, and rib 227 is angularly disposed with respect to rib 228, such that first major surfaces S1 on the inner side of ribs 225 and 226, and ribs 227 and 228, respectively, form an angle less than 180°. When temple piece 210 is flexed such that eyewear article 200 may be positioned for use on the head of a user, ribs 225, 226, 227 and 228 rotate such that first major surfaces S1 of ribs 225 and 226, and ribs 227 and 228, respectively, form an angle closer to 180° than in an unflexed state. In another exemplary embodiment, rib 225 is angularly disposed with respect to rib 226, and rib 227 is angularly disposed with respect to rib 228, such that the second major surfaces S2, on the outer side of ribs 225 and 226 and ribs 227 and 228, respectively, form an angle less than 180°. When temple piece 210 is flexed such that eyewear article 200 may be positioned for use on the head of a user, ribs 225, 226, 227 and 228 rotate such that second major surfaces S2 of ribs 225 and 226, and ribs 227 and 228, respectively, form an angle closer to 180° than in an unflexed state. In another exemplary embodiment, one or more of ribs 225, 226, 227, and 228 are disposed such that one or both of first and second major surfaces S1 and S2 are not perpendicular to the transverse plane of eyewear article 200. That is, one or both of first and second major surfaces S1 and S2 are not within 5° of forming a 90° angle with a transverse plane of eyewear article 200. When temple piece 210 is flexed such that eyewear article 200 may be positioned for use on the head of a user, ribs 225, 226, 227 and 228 rotate such that one or both of the first and second major surfaces S1 or S2 of ribs 225 and 226, and ribs 227 and 228, respectively, are closer to being in perpendicular relation to the transverse plane of eyewear article 200.

In the exemplary embodiment shown in FIG. 9, slots 229 are defined between each rib. In alternative exemplary embodiments, the inner peripheral edges may define a plurality of slots, grooves, or other openings, and the first and second ribs may be joined completely or partially along the lengths of the ribs, by having connected inner peripheral edges for example.

In an exemplary embodiment, longitudinally disposed ribs 225, 226, 227, and 228 are substantially identical to the ribs described above with reference to eyewear article 100, and function in a similar manner to produce a desired force at contact portion 212 over a range of temple separations. A flexing portion having four longitudinally disposed ribs has the functionality and advantages of a single pair of ribs, as described herein, while providing further torsional stability such that contact portions 212 are more likely to remain in a desired orientation, for example a substantially vertical orientation, as temple piece 210 is deflected to accommodate the head of a user. In an exemplary embodiment, flexing portion 220 has a torsional stiffness K about its longitudinal axis that is greater than 32 N-mm/radian, or greater than 56 N-mm/radian. Torsional stiffness can be defined as the ratio of an applied torsion moment to an angle of twist, and can be used to characterize resistance to torsional rotation. A flexing portion having a greater torsional stiffness requires a greater force to undergo rotation about a longitudinal axis, and thus a temple piece having a flexing portion with a greater torsional stiffness is more likely to remain in a desired orientation as the temple piece is deflected to accommodate the head of a user.

In various embodiments of the invention, the flexing portion has a maximum height H that is greater than 15 mm, or greater than 20 mm, or greater than 24 mm. A flexing portion having a maximum height H as specified above may include four longitudinally ribs, or may include two longitudinally disposed ribs of relatively greater height. As the maximum height H increases, the torsional stiffness increases. Accordingly, a flexing portion having a maximum height H as specified above is more likely to remain in a desired orientation as a temple piece is deflected to accommodate the head of a user.

In various embodiments, an eyewear article according to the present invention may include two, three, four, or more longitudinally disposed ribs while obtaining the advantages and characteristics described herein. In an exemplary embodiment, eyewear article 200 includes more than two longitudinally disposed ribs, and each rib comprises first and second major surfaces separated by a thickness (t), and the first major surface of each rib is not perpendicular with respect to a transverse plane bisecting the eyewear article into imaginary upper and lower halves.

Exemplary temple piece 210 having the above describe features provides sufficient torsional stability such that contact portion 212 remains in a substantially vertical orientation at any position within a particular range of temple separations, and resists rotation about the longitudinal axis of the temple piece.

An eyewear article having various features and combinations of features described herein provides several benefits. Many prior art designs appear to exhibit a linear force-displacement response such that the force exerted by a temple piece increases linearly with a relatively high slope as the temple piece is deflected, and significantly different levels of force are exerted by a temple piece when the eyewear article is positioned on heads having different widths. Accordingly, a single eyewear article may provide different levels of comfort when used by individuals having different head widths. In contrast to many prior designs, an eyewear article according to the present invention provides a balance of fit and comfort over a range of head widths by providing an eyewear article that exhibits a non-linear force-displacement response over a portion of a range of expected temple separations, or a linear force-displacement response with a relatively low slope. Due to the combination of a flexing portion that exhibits an area moment of inertia that changes as the flexing portion is flexed, and a flexing portion having an inherent curvature, a single eyewear article may provide a desired force level on users having relatively small head widths as well as on users having relatively large head widths. Further, the costs associated with providing eyewear articles of different sizes to users having different head widths are reduced, and manufacturing costs associated with designs incorporating complex or moving parts is minimized.

EXAMPLES

The characteristics, operation, and advantages of the present invention will be further described with regard to the following detailed non-limiting examples. These examples are offered to further illustrate the various specific and preferred embodiments and techniques. It should be understood, however that many variations and modifications may be made while remaining within the scope of the present invention.
Procedure 1: Force-Deflection Measurement A measurement of the force exerted at a contact portion versus deflection of a temple piece provides an indication of comfort that an eyewear article may exhibit over a range of head sizes. Values indicated as temple separations are analogous to head widths, and are approximately twice the distance d, described above, that separates contact portion 112 of temple piece 110 from mid-sagittal plane 161 of eyewear article 100. The force obtained for each temple separation is comparable to the force that will be exerted at a contact portion when the eyewear article is positioned for use on a human head.

Force versus deflection data was obtained using a custom fixture including a lens support and two Mark-10 MG05 force gauges, available from Mark-10 Corp. of Long Island, N.Y. Each force gauge was mounted on translation stages and positionable with a drive screw such that a load post of each force gauge moved an equal distance from a center point of the fixture as the drive screw was turned. That is, each load post was approximately equidistant from a mid-sagittal plan dividing the eyewear article into imaginary left and right halves. A linear scale was provided to indicate the distance between the load posts of each force gauge. The sample was placed on the fixture with the lens clamped to the lens support and each temple piece positioned to the outside of the respective load post. The initial distance between the load posts was 80 mm, and the load posts contacted the temple piece at a distance approximately 110 mm from the front of the lens of the sample. The separation distance between each load post, and accordingly a contact portion of each temple piece, can be said to correspond to a head width of equal magnitude. Force measurements were recorded from each load cell at 10 mm increments between 130 mm and 180 mm of load post spacing. The temple pieces were not clamped or fixed to the load posts, and were free to move relative to the load posts as the separation distance between the load posts was increased.

Examples 1 through 5

Examples 1 through 5 were measured according to Procedure 1. The sample of Example 1 was VIRTUA® #70-0715- 3942-6 safety glasses available from 3M Company. The sample of Example 2 was GRAVITY ZERO #9191.265 safety glasses available from Uvex Safety Group. The sample of Example 3 was MONTEGO #SB5310S safety glasses available from Pyramex. The sample of Example 4 was an eyewear article according to the present invention, and constructed of a material referred to as XYLEX 8300, available from Sabic Innovative Plastics. The sample of Example 5 was an eyewear article according to the present invention, and constructed of a material referred to as D100 ST, available from DuPont.

Figure 10:
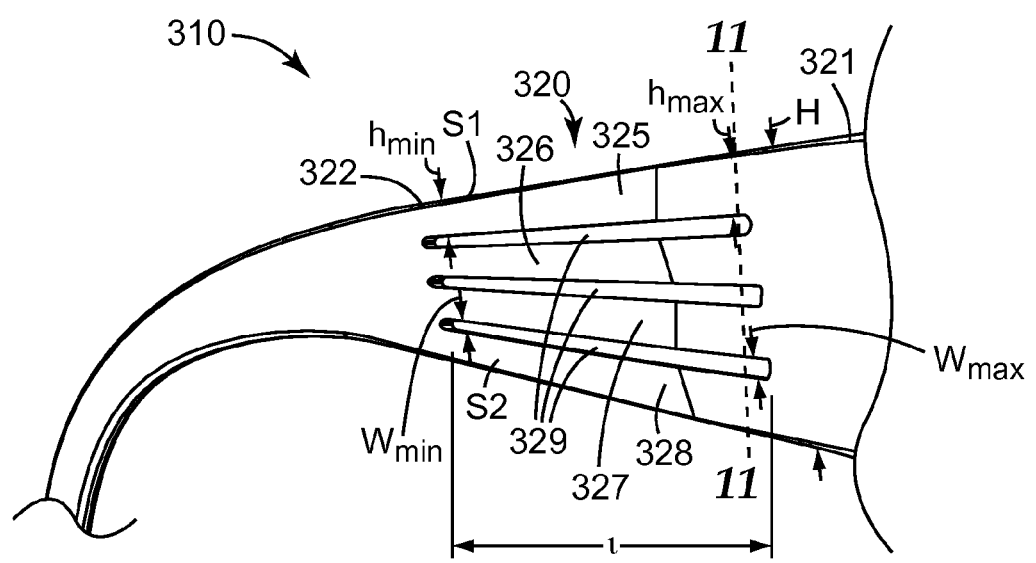
FIG. 10 is a side view of an exemplary embodiment of a flexing portion according to the present invention.
Figure 11:
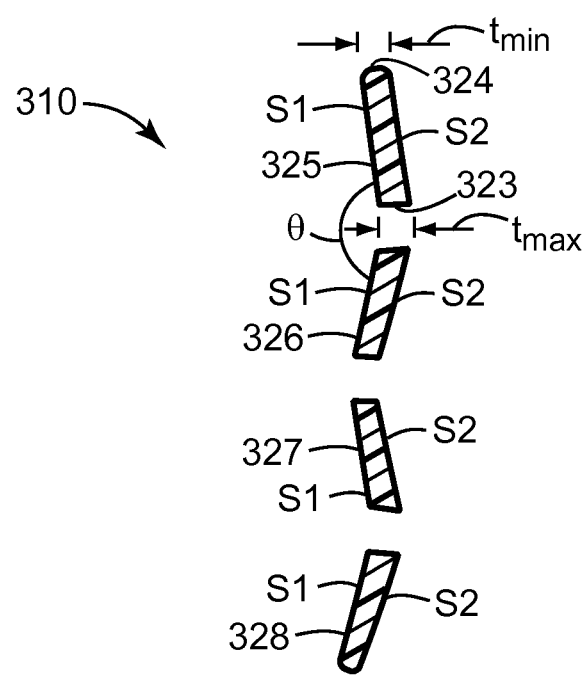
FIG. 11 is sectional view of an exemplary embodiment of a flexing portion according to the present invention.

The samples of Examples 4 and 5 were dimensioned consistent with the exemplary embodiments shown in FIGS. 7, 10, and 11. FIG. 7 provides a scale drawing of a top view of exemplary temple piece 110 according to the present invention. The flexing portion has a radius of curvature of approximately 50 mm. FIG. 10 provides a side view of an eyewear article according to the present invention. Each of ribs 325, 326, 327, and 328 has a maximum height hmax of approximately 5 mm and a minimum height hmin of approximately 2.5 mm. The length l of each rib is approximately 30 mm. Slots 329 have a maximum width Wmax of approximately 1.5 mm, and a minimum width Wmin of approximately 0.8 mm.

FIG. 11 provides a sectional view at lines 11-11 of FIG. 10. Each rib has a thickness that decreases from a maximum thickness tmax at inner peripheral edge 323, to a minimum thickness tmin at outer peripheral edge 124. Thickness tmax at inner peripheral edge 323 is approximately 1.5 mm along the length l of each rib. Thickness tmin at outer peripheral edge 324 of each rib varies along the length of the rib from a thickness of approximately 1.0 mm at each end to a thickness of approximately 0.5 mm at a distance along length l of approximately 10 mm from the end of each rib nearest first end 321 of flexing portion 320. An angle θ formed by the inner surfaces 51 of each of ribs 125 and 126 at a midpoint of the length of ribs 125 and 126 is approximately 155°.

TABLE 1

| Temple Separation (mm) Sample | Ex. 1 VIRTUA | Ex. 2 GRAVITY ZERO | Ex. 3 Material MONTEGO | Ex. 4 XYLEX 8300 | Ex. 5 D100 ST |
|---|---|---|---|---|---|
| 130 | 16.8 | 63.5 | 105.5 | 53 | 43.5 |
| 140 | 50 | 86 | 113.2 | 69.5 | 55 |
| 150 | 69.5 | 108.5 | 120.7 | 83.5 | 66.5 |
| 160 | 90.9 | 130 | 125.7 | 95 | 73 |
| 170 | 125.8 | 154.5 | 129.2 | 102 | 75 |
| 180 | 153.7 | 175 | 129.5 | 108 | 74.5 |

Table 1 indicates the force in grams measured at a contact portion according to Procedure 1 for Examples 1 through 5. The samples of Examples 1 through 3 lacked flexing portions having longitudinally disposed ribs according to the present invention, and did not provide desired force levels, for example levels between 50 and 140 grams, over a range of temple separations.

Example 1 failed to provide desired force levels over an entire range of normal head sizes between 130 mm and 180 mm. When the temple separation of the sample of Example 1 was 130 mm, the force exerted at a contact portion was less than 20 grams. Such a value is below a desired range, and a user having a head width of approximately 130 mm may perceive the eyewear to be insecure. Similarly, when the temple separation of the sample of Example 1 approached 180 mm, the force exerted at a contact portion exceeded 150 grams. As a result, the eyewear article is likely to cause excessive pressure on the head of a user, resulting in discomfort. Ultimately, the force exerted at a contact portion of the sample of Example 1 falls within a desired level only for a narrow range of head sizes as compared to the samples of Example 4 or 5, for example.

The sample of Example 2 similarly failed to provide desired force levels over an entire range of normal head sizes between 130 mm and 180 mm. At a temple separation of 150 mm, the force exerted at a contact portion exceeded 100 grams. At a temple separation of 180 mm, the force exerted at a contact portion was 175 grams. Accordingly, discomfort is likely to result when such eyewear is worn by a user having a head width of 180 mm.

The force exerted at a contact portion of the sample of Example 3 varies only between 105.5 grams and 129.5 grams, but is consistently above a desired level of force within a range of temple separations between 130 mm and 180 mm. Accordingly, the force at a contact portion is likely greater than necessary to provide the optimum level of security, and may cause discomfort to a user.

The samples of Examples 4 and 5 provided desirable force levels over a range of temple separations. The sample of Example 4, having features according to the present invention, exhibited a force level of approximately 50 grams at a temple separation of 130 mm. Such a force is within a desired range, and will provide a perceived balance of security of fit and comfort. As the temple separation increased through values up to 180 mm, the force remained below 110 grams. In the sample of Example 5, force exerted at a contact portion was approximately 73 grams at a temple separation of 130 mm, and remained nearly constant through temple separations of 180 mm. In contrast to the traditional eyewear of Examples 1 and 2, the sample of Example 5 did not exert a level of force at a contact portion likely to be uncomfortable, even when the temple separation approached 180 mm.

Ultimately, the samples of Examples 4 and 5 provided desirable force levels over a range of temple separations such that sufficient force was generated to provide a secure fit for relatively small head widths, while the maximum force was limited to a comfortable range when positioned on a head having a relatively large width.

Procedure 2: Torsional Stiffness Measurement

A temple piece having greater torsional stiffness may resist rotation about the longitudinal axis of the temple piece, or rotation out of the plane defined by the temple piece in an unflexed state, such that the contact portion remains in a substantially vertical orientation at any position within a range of temple separations corresponding to a desired range of head sizes. Comfort of an eyewear article may be reduced if, for example, only an edge of a contact portion of an eyewear article contacts the head of a user, resulting in areas of focused pressure impinging upon a user's head. Accordingly, a temple piece having a greater torsional stiffness may be less likely to rotate such that only an edge of a contact portion contacts the head of a user.

Torsional characteristics of flexing portions of exemplary temple pieces were obtained according to the following procedure. Samples were put into rotation from a rest position over angles in which torque versus rotation was substantially linear. The material response was elastic in this region such that torsional stiffness K was approximately equal to the measured reactive torque T divided by the angle of rotation $\phi$ in which the flexing portion was forced to twist due to coupled action of rotation of the motor with each sample. The resultant K was the computed torsional stiffness in ounce-inch/degree, and was converted in N-mm/radian.

A torsion test fixture was built to measure torque response of the flexing portion of eyewear temple pieces. The fixture consisted of a Model TFF325 torque cell having a 20 inch-ounce (~141.23 N-mm) full scale capacity, available from Futek Advanced Sensor Technology, Inc. of Irvine, Calif., a TMO-1 signal conditioner available from Transducer Techniques of Temecula, Calif., and TracerDaq software for data acquisition available from Measurement Computing of Norton, Mass. The fixture further included an Omega HT23-597 rotational stepper motor using SI programmer V2.7.19 for motor control, and associated mechanical fixtures for coupling a sample to the rotation stage and torque cell.

The portion of the temple piece extending beyond the flexing portion, including the contact portion, was trimmed from each sample in order to minimize the effects of inherent curvature of the sample or level arm effects on the resultant torque during testing. The resultant sample length was 50 mm.

Samples were fixtured such that the cut end was attached to the stepper motor and the opposite end was attached to the reaction torque transducer, and the angle between the axis of the rotational motor's shaft and torque cell was adjusted so that the temple section to be tested was substantially free of preloads, shear, compression, tension or bending. The motor shaft was actuated via software at a rate of 0.00139 revolutions per second in a clockwise direction such that the sample experienced clockwise twisting when viewing the temple from the front as when attached to an eyewear article. A command set-point of 10° maximum rotation was used to maintain the sample in an elastic region.

After data acquisition, torque T was plotted versus angle of rotation $\phi$ and torsional stiffness was obtained as the linear curve fit of the data.

Examples 6 through 11

Examples 6 through 11 were obtained using procedure 2 described above. The samples of Examples 6 through 11 were flexing portions according to the present invention and were dimensioned consistent with FIGS. 7, 10, and 11, as described above. The samples of Examples 7, 9, and 11 were clipped to remove each of ribs 327 and 328, such that only ribs 325 and 326 remained. The samples of Examples 6 and 7 were flexing portions constructed of D100 ST acetal resin, available from DuPont. The samples of Examples 8 and 9 were flexing portions constructed of PC124R polycarbonate resin, available from Sabic Innovative Plastics. The sample of Examples 10 and 11 were constructed of XYLEX 7300 polycarbonate resin, available from Sabic Innovative Plastics.

TABLE 2

| Example # | Material | # of Ribs | Torsional Stiffness (K) (oz-in/degree) (Computed) | Torsional Stiffness (K) (N-mm/rad) (Equivalent) | % increase in stiffness of 4 rib sample |
|---|---|---|---|---|---|
| 6 | D100 ST | 4 | 0.124 | 50.2 | ~258 |
| 7 | D100 ST | 2 | 0.048 | 19.4 | |
| 8 | PC124R | 4 | 0.266 | 108 | ~350 |
| 9 | PC124R | 2 | 0.076 | 30.7 | |
| 10 | XYLEX 7300 | 4 | 0.146 | 59.1 | ~298 |
| 11 | XYLEX 7300 | 2 | 0.049 | 19.8 | |

Table 2 indicates the torsional stiffness of Examples 6 through 11 as measured according to Procedure 2 described above. Samples 6, 8, and 10 having four ribs exhibited a substantially greater torsional stiffness than samples 7, 9, and 11 having two ribs. The flexing portions of Examples 6, 8, and 10 having a torsional stiffness of 50.2, 108, and 59.1 N-mm/rad, respectively, provided a desirable level of torsional stiffness of greater than 32 N-mm/rad. The flexing portions of Examples 8 and 10 provided a desirable level of torsional stiffness of greater than 56 N-mm/rad.

Ultimately, examples having four ribs, and a greater height H, exhibited greater torsional stiffness. Contact portions of a temple piece having similar flexing portions would be less likely to rotate out of the plane of bending, and less likely to cause discomfort due to only an edge of the contact portion contacting the head of a user. Samples 7, 9, and 11 exhibited a relatively low torsional stiffness, and were more likely to rotate out of the normal plane of bending of the temple piece.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures. Any feature or characteristic described with respect to any of the above embodiments can be incorporated individually or in combination with any other feature or characteristic, and are presented in the above order and combinations for clarity only.

What is claimed is:

1. An eyewear article, comprising:
    a temple piece extending rearwardly from a front of an eyewear article comprising a flexing portion having a radius of curvature ($\rho$) and having first and second longitudinally disposed ribs;
    wherein when the temple piece is in an unflexed state, the first rib is angularly disposed with respect to the second rib and $\rho<80$ mm.

2. The eyewear article of claim 1, wherein 20 mm<$\rho$<60 mm.

3. The eyewear article of claim 1, wherein 45 mm<$\rho$<55 mm.

4. The eyewear article of claim 1, wherein the flexing portion has a maximum radius of curvature ($\rho M$) and a minimum radius of curvature ($\rho m$), and [$\rho M$-$\rho m$]<5 mm.

5. The eyewear article of claim 1, wherein the eyewear article further comprises an attachment portion, and the temple piece is rotatably secured to the attachment portion, and wherein 20 mm<$\rho$<80 mm at a distance 30 mm from the attachment portion along the length of the temple piece.

6. The eyewear article of claim 1, wherein the first and second ribs rotate relative to one another when the flexing portion is flexed to accommodate the head of a user.

7. The eyewear article of claim 1, wherein each rib comprises first and second major surfaces separated by a thickness (t), and each rib comprises a length (l) in the longitudinal direction of the rib and a height (h) in a direction perpendicular to each of the thickness (t) and the length (l), and wherein the first and second major surfaces are substantially planar.

8. The eyewear article of claim 7, wherein 15 mm<l<45 mm.

9. The eyewear article of claim 7, wherein the height (h) of each rib varies along the length of each rib.

10. The eyewear article of claim 1, wherein the flexing portion comprises more than two longitudinally disposed ribs, and each rib comprises first and second major surfaces separated by a thickness (t), and the first major surface of each rib is not perpendicular with respect to a transverse plane bisecting the eyewear article into imaginary upper and lower halves.

11. The eyewear article of claim 1, wherein the temple piece comprises a material selected from the group consisting of polycarbonates, polyesters, polyamides, and acetals.

12. The eyewear article of claim 1, wherein the flexing portion is made of a material having a flexural modulus between 800 MPa and 2500 MPa.

13. The eyewear article of claim 1, wherein the flexing portion is made of a material having a flexural modulus between 800 MPa and 1700 MPa.

14. The eyewear article of claim 1, wherein the flexing portion is made of a material having a flexural modulus between 1000 MPa and 1200 MPa.

15. The eyewear article of claim 1, wherein the temple piece further comprises a contact portion, and a force (F) exerted normal to the contact portion is between 50 g and 140 g when the eyewear article is positioned for use on a human head having a width (W) between 130 mm and 170 mm.

16. The eyewear article of claim 15, wherein 50 g<F<110 g.

17. The eyewear article of claim 15, wherein 70 g<F<110 g when 150 mm<W<180 mm.

18. The eyewear article of claim 1, wherein the temple piece further comprises a contact portion, and wherein a first force (F1) is exerted normal to the contact portion when the eyewear article is positioned for use on a human head having a width of 130 mm, and a second force (F2) is exerted normal to the contact portion when the eyewear article is positioned for use on a human head having a width of 180 mm, and wherein (F2-F1)<50 grams.

19. An eyewear article, comprising:
    a temple piece extending rearwardly from a front of an eyewear article comprising a flexing portion having a radius of curvature ($\rho$) and having first and second longitudinally disposed ribs;
    wherein each rib comprises first and second major surfaces separated by a thickness (t), and when the temple piece is in an unflexed state, $\rho<80$ mm and the first major surface of each rib is not perpendicular with respect to a transverse plane bisecting the eyewear article into imaginary upper and lower halves.

20. The eyewear article of claim 19, wherein the temple piece further comprises a contact portion, and wherein a first force (F1) is exerted at the contact portion when the eyewear article is positioned for use on a human head having a width of 130 mm, and a second force (F2) is exerted at the contact portion when the eyewear article is positioned for use on a human head having a width of 180 mm, and wherein (F2-F1) <50 grams.

* * * * *